United States Patent
Rizza et al.

(10) Patent No.: US 10,683,887 B2
(45) Date of Patent: *Jun. 16, 2020

(54) FASTENER LOCKING MEMBERS

(71) Applicant: Arconic Inc., Pittsburgh, PA (US)

(72) Inventors: Gregory Rizza, Huntington Beach, CA (US); Luke Haylock, Culver City, CA (US); Rodrigo Pinheiro, Seal Beach, CA (US)

(73) Assignee: Arconic Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,788

(22) Filed: Feb. 6, 2019

(65) Prior Publication Data

US 2019/0170182 A1 Jun. 6, 2019

Related U.S. Application Data

(62) Division of application No. 15/239,206, filed on Aug. 17, 2016, now Pat. No. 10,215,218.

(Continued)

(51) Int. Cl.
*F16B 37/00* (2006.01)
*F16B 39/282* (2006.01)
(Continued)

(52) U.S. Cl.
CPC ............ *F16B 39/282* (2013.01); *B64D 45/02* (2013.01); *F16B 5/01* (2013.01); *F16B 19/05* (2013.01); *F16B 37/00* (2013.01); *F16B 4/004* (2013.01)

(58) Field of Classification Search
CPC ........... F16B 37/00; F16B 19/05; B64D 45/02
(Continued)

(56) References Cited

U.S. PATENT DOCUMENTS

| | | | |
|---|---|---|---|
| 3,508,775 A | | 4/1970 | Simonson |
| 4,136,596 A | * | 1/1979 | Davis, Jr. ................ F16B 19/05 |
| | | | 411/360 |

(Continued)

FOREIGN PATENT DOCUMENTS

| | | |
|---|---|---|
| DE | 4315450 A1 | 5/1994 |
| EP | 1447576 A1 | 8/2004 |

(Continued)

OTHER PUBLICATIONS

Notification of Transmittal of the International Search Report and the Written Opinion of the International Searching Authority, or Declaration dated Nov. 2, 2016, issued by the European Patent Office in International Application No. PCT/US2016/047316 (8 pages).

*Primary Examiner* — Flemming Saether
(74) *Attorney, Agent, or Firm* — Greenberg Traurig, LLP

(57) ABSTRACT

A locking member for a fastener, such as a nut or a collar, includes a shank portion and a flanged portion, a bore extending the shank portion and the flanged portion and including a first interior portion located within the shank portion and a containment cavity located within the flanged portion, and an inner wall defining the containment cavity. The containment cavity includes an inner diameter that is greater than an inner diameter of the first interior portion of the bore. The inner wall of the containment cavity includes one or a combination of flat/linear surfaces, concave surfaces, and convex surfaces.

5 Claims, 7 Drawing Sheets

Related U.S. Application Data

(60) Provisional application No. 62/210,677, filed on Aug. 27, 2015.

(51) Int. Cl.
    *F16B 5/01*     (2006.01)
    *F16B 19/05*     (2006.01)
    *B64D 45/02*     (2006.01)
    *F16B 4/00*     (2006.01)

(58) Field of Classification Search
    USPC .................................................. 411/427, 361
    See application file for complete search history.

(56) References Cited

U.S. PATENT DOCUMENTS

| | | |
|---|---|---|
| 5,533,863 A | 7/1996 | Tornquist et al. |
| 5,709,356 A | 1/1998 | Avenet et al. |
| 5,863,164 A | 1/1999 | Leistner |
| 9,212,682 B2 | 12/2015 | Yamazaki |
| 9,291,187 B2 | 3/2016 | Whitlock et al. |
| 2008/0145181 A1 | 6/2008 | Lynes et al. |
| 2016/0068275 A1 | 3/2016 | Rizza et al. |

FOREIGN PATENT DOCUMENTS

| | | |
|---|---|---|
| JP | 7-190033 | 7/1995 |
| JP | 11-62939 | 3/1999 |
| JP | 2002-36802 | 2/2002 |
| WO | 8705976 A1 | 10/1987 |

\* cited by examiner

FASTENER LOCKING MEMBERS

CROSS-REFERENCE TO RELATED APPLICATION

This application is a divisional of U.S. Utility patent application Ser. No. 15/239,206 filed on Aug. 17, 2016 entitled "FASTENER LOCKING MEMBERS", which claims the benefit of U.S. Provisional Patent Application Ser. No. 62/210,677, filed Aug. 27, 2015, entitled "LIGHTWEIGHT RESILIENT NUT AND COLLAR," the entireties of which are incorporated herein by reference.

FIELD OF THE INVENTION

The present invention relates to locking members for fasteners and, more particularly, to fastener nuts and collars.

BACKGROUND OF THE INVENTION

Continuous fiber reinforced composites are extensively used in both primary and secondary aircraft components for a variety of applications where light weight, higher strength and corrosion resistance are primary concerns. Composites are typically composed of fine carbon fibers that are oriented at certain directions and surrounded in a supportive polymer matrix. Since the plies of the composite material are arranged at a variety of angles, and depending upon the direction of major loading, the resultant structure is typically a stacked laminated structure, which is highly anisotropic and heterogeneous. A significant portion of the composite structure is fabricated as near net-shape, but is drilled in order to facilitate joining of components using mechanical fasteners. Drilling fastener holes in composite does not compare to the uniformity of aluminum or steel since individual carbon fibers fracture at irregular angles and form microscopic voids between the fastener and the hole. As the cutting tool wears down, there is an increase of surface chipping and an increase in the amount of uncut fibers or resin and delamination. The composite microstructure containing such defects is referred to as "machining-induced micro texture."

Installation of fasteners into composite structures presents its own challenge as well, with the added risk of causing delamination between the plies, an issue not present in homogenous metallic structures. One source of delamination between the plies is too much interference of the composite structure with the fastener during installation. Another is delamination due to high fastener installation loads, in which the plies and mating epoxy become damaged during installation and thereby affect the mechanical integrity of the composite structure.

In addition to their machining and installation challenges, composite structures in aircraft are more susceptible to lightning damage compared to metallic structures. In part, this is due to the intrinsic electrical conductivity of composite structures, their multi-layer construction, and their anisotropic nature. For these reasons along with the hybrid nature of aircraft structures and relative conductivity of the various elements used in these structures, lightning protection of composite aircraft can become very complex.

Composite structures such as wings are usually constructed of a combination of metallic and composite structural elements which are joined together with metallic fasteners. While the metallic elements are good electrical conductors which efficiently dissipate high currents, composite elements are inefficient electrical conductors. The electrical field distribution and consequently the current density distribution associated with lighting strikes to hybrid structures like aircraft increases the importance and necessity for sufficient lightning management in aircraft.

Some estimates indicate that, on average, each commercial aircraft in service is struck by lightning at least once per year. It is also well established that metallic fasteners are often both the preferred point of lightning attachment and a primary pathway for lightning current. Aircraft flying in and around thunderstorms are often subjected to direct lightning attachment as well as indirect lightning effects which occur from the attachment of lightning current elsewhere on the aircraft and the subsequent flow of lightning current across the aero-structure interface. This often results in multiple points of attachment, and lightning currents which indirectly interact with fasteners other than the primary and secondary points of attachment.

Fasteners often act as pathways for the conduction of the lightning currents from the skin of the aircraft to supporting structures such as spars or ribs. As such, both modes of attachment can result in damage to the fastener and the area of the structure surrounding the fastener as the current density is significantly increased locally. The struck fastener often interacts with the surrounding structure in a manner that results in the ejection of hot particles from the fastener/structure interface. This condition is commonly referred to as Hot Particle Ejection or "HPE." HPE can be caused by both direct and indirect lightning effects, but the risks associated with direct effects are generally perceived to be higher. HPE can occur in composite, hybrid or aluminum structures.

The portion of the aircraft which is of greatest concern is the area near the fuel tank where both the risk of HPE and its consequence are perceived to be highest. Since commercial aircraft contain relatively large amounts of fuel and also include very sensitive electronic equipment, they are required to comply with a specific set of requirements related to lightning strike protection in order to be certified for operation. As such, HPE could create a detrimental ignition source capable of compromising the integrity of the fuel system. Thus, there is a need for resilient and cost-effective countermeasures to HPE.

SUMMARY OF THE INVENTION

In an embodiment, a locking member includes a first end, a second end opposite the first end, a shank portion extending from the first end to a location intermediate the first and second ends, a flanged portion extending from the shank portion and to the second end, a bore extending from the first end to the second end and including a first interior portion located within the shank portion and a containment cavity located within the flanged portion and proximate to the first end, and an inner wall defining a containment cavity, the containment cavity including an inner diameter that is greater than an inner diameter of the first interior portion of the bore. In an embodiment, the inner wall of the containment cavity includes a first concave surface located proximate to the first interior portion, a second concave surface located proximate to the first end, and a first flat surface intermediate and joining the first and second concave surfaces. In an embodiment, the inner wall of the containment cavity includes a second flat surface joining the first concave surface with the first interior portion. In an embodiment, the first interior portion includes a threaded portion.

In another embodiment, the inner wall of the containment cavity includes a first convex surface located proximate to the first interior portion, a second convex surface located proximate to the first end, and a first flat surface intermediate and joining the first and second convex surfaces. In an embodiment, the inner wall includes a second flat surface joining the first convex surface with the first interior portion. In an embodiment, the first interior portion includes a threaded portion.

In another embodiment, a surface area of the first convex surface is greater than a surface area of the second convex surface. In an embodiment, a surface area of the first convex surface is less than a surface area of the second convex surface. In an embodiment, a surface area of the first convex surface is equal to a surface area of the second convex surface.

In another embodiment, the inner wall of the containment cavity includes a convex surface located proximate to the first interior portion, a concave surface located proximate to the first end, and a first flat surface intermediate and joining the convex surface and the concave surface. In an embodiment, the inner wall of the containment cavity includes a second flat surface joining the convex surface with the first interior portion. In an embodiment, the first interior portion includes a threaded portion. In an embodiment, a surface area of the convex surface is greater than a surface area of the concave surface. In an embodiment, the surface area of the convex surface is less than the surface area of the concave surface. In an embodiment, the surface area of the convex surface is equal to the surface area of the concave surface.

In another embodiment, the inner wall of the containment cavity includes a concave surface located proximate to the first interior portion, a convex surface located proximate to the first end, and a first flat surface intermediate and joining the concave surface and the convex surface. In an embodiment, the inner wall includes a second flat surface joining the concave surface with the first interior portion. In an embodiment, the first interior portion includes a threaded portion. In an embodiment, a surface area of the concave surface is greater than a surface area of the convex surface. In an embodiment, the surface area of the concave surface is less than the surface area of the convex surface. In an embodiment, the surface area of the concave surface is equal to the surface area of the convex surface.

In another embodiment, the inner wall of the containment cavity includes a first flat surface located proximate to the first interior portion, a second flat surface located proximate to the first end, and a third flat surface intermediate and joining the first flat surface and the second flat surface. In an embodiment, the inner wall of the containment cavity includes a fourth flat surface joining the first flat surface with the first interior portion. In an embodiment, the first interior portion includes a threaded portion. In an embodiment, a surface area of the first flat surface is greater than a surface area of the second flat surface. In an embodiment, a surface area of the first flat surface is less than a surface area of the second flat surface. In an embodiment, a surface area of the first flat surface is equal to a surface area of the second flat surface.

In another embodiment, the inner wall of the containment cavity includes a first flat surface located proximate to the first interior portion, a first concave surface located proximate to the first end, and a second flat surface intermediate and joining the first flat surface and the first concave surface. In an embodiment, the inner wall of the containment cavity includes a third flat surface joining the first flat surface with the first interior portion. In an embodiment, the first interior portion includes a threaded portion.

In another embodiment, the inner wall of the containment cavity includes a plurality of surfaces selected from the group consisting of flat surfaces, concave surfaces, and convex surfaces.

In another embodiment, the inner wall of the containment cavity includes a first region located proximate to the first interior portion and having a plurality of concave surfaces, a second region located proximate to the first end and having a concave surface and a first flat surface adjacent to the concave surface, and a second flat surface intermediate and joining the first region and the second region. In an embodiment, the inner wall of the containment cavity includes a third flat surface joining the first region with the first interior portion. In an embodiment, the first interior portion includes a threaded portion. In an embodiment, the flanged portion includes an annular outer portion extending outwardly therefrom.

In an embodiment, the locking member is a nut. In another embodiment, the locking member is a collar. In another embodiment, the collar is a swage collar. In an embodiment, the containment cavity enables the nut/collar to be more compliant with a fastened structure, and, as such, conforms to the surface of the structure and creates an intimate seal along the bearing surface of the structure. The containment cavity is adapted to prevent the out-gassing of sparking material projected from the fastener-structure interface by reducing the internal pressure created during a lightning strike.

DETAILED DESCRIPTION OF THE DRAWINGS

Figure 1:
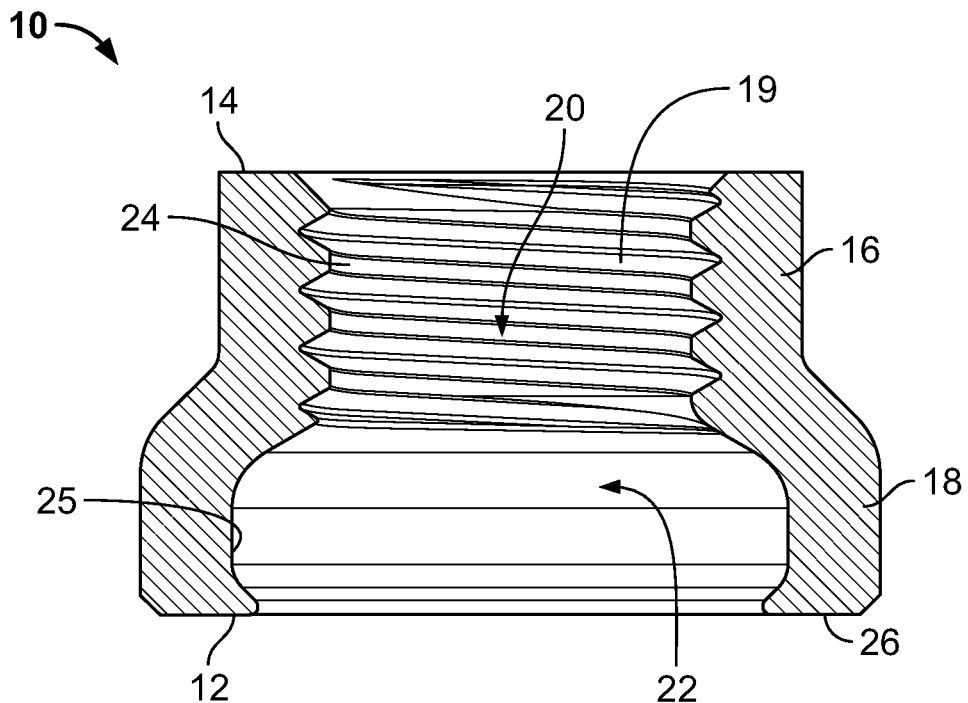
FIG. 1 is a side cross-sectional view of an embodiment of a nut.

Referring to FIG. 1, in an embodiment, a nut 10 includes a first end 12, a second end 14 opposite the first end 12, a substantially cylindrical-shaped shank portion 16, and a flanged portion 18 extending outwardly from the shank portion 16. In an embodiment, an outer diameter of the flanged portion 18 is greater than an outer diameter of the shank portion 16. In an embodiment, a centrally located bore 20 extends from the first end 12 to the second end 14. In an embodiment, the bore 20 includes a containment cavity 22 located proximate to the first end 12, and a threaded portion 24 located proximate to the second end 14. In an embodiment, the threaded portion 24 includes a plurality of internal threads 19 that are adapted to engage threadedly a pin member or bolt having external threads (not shown in the Figures). In an embodiment, the flanged portion 18 includes a bearing surface 26 located at the first end 12. In an embodiment, the bearing surface 26 engages an outer surface of a work piece, such as a structure (not shown in the Figures). In an embodiment, the containment cavity 22 includes an inner wall 25 that defines the size and shape of the containment cavity 22, embodiments of which will be described in more detail hereinafter. In an embodiment, the nut 10 is made from steel. In another embodiment, the nut 10 is made from aluminum. In an embodiment, the nut 10 is made from a titanium alloy, a nickel-based alloy, a copper-based alloy, or a stainless steel-based alloy. In other embodiments, the nut 10 can be made from other materials known in the art. In an embodiment, as part of a fastener, the nut 10 is adapted to engage threadedly a pin member or bolt having external threads in order to secure a plurality of work pieces to one another, the pin member/bolt being adapted to be installed within aligned holes in the work pieces (not shown in the Figures). In an embodiment, the work pieces are formed of a composite material. In other embodiments, the work pieces can be made of metal or a combination of composite and metal materials. In an embodiment, the fastener includes a sleeve member (not shown in the Figures). In an embodiment, the pin member/bolt and the sleeve member each have a structure and function that are, or are similar to, the structure and function to the pin members and sleeve members disclosed in U.S. Pat. No. 7,695,226 to March et al, the entirety of which is incorporated by reference herein.

Figure 2:
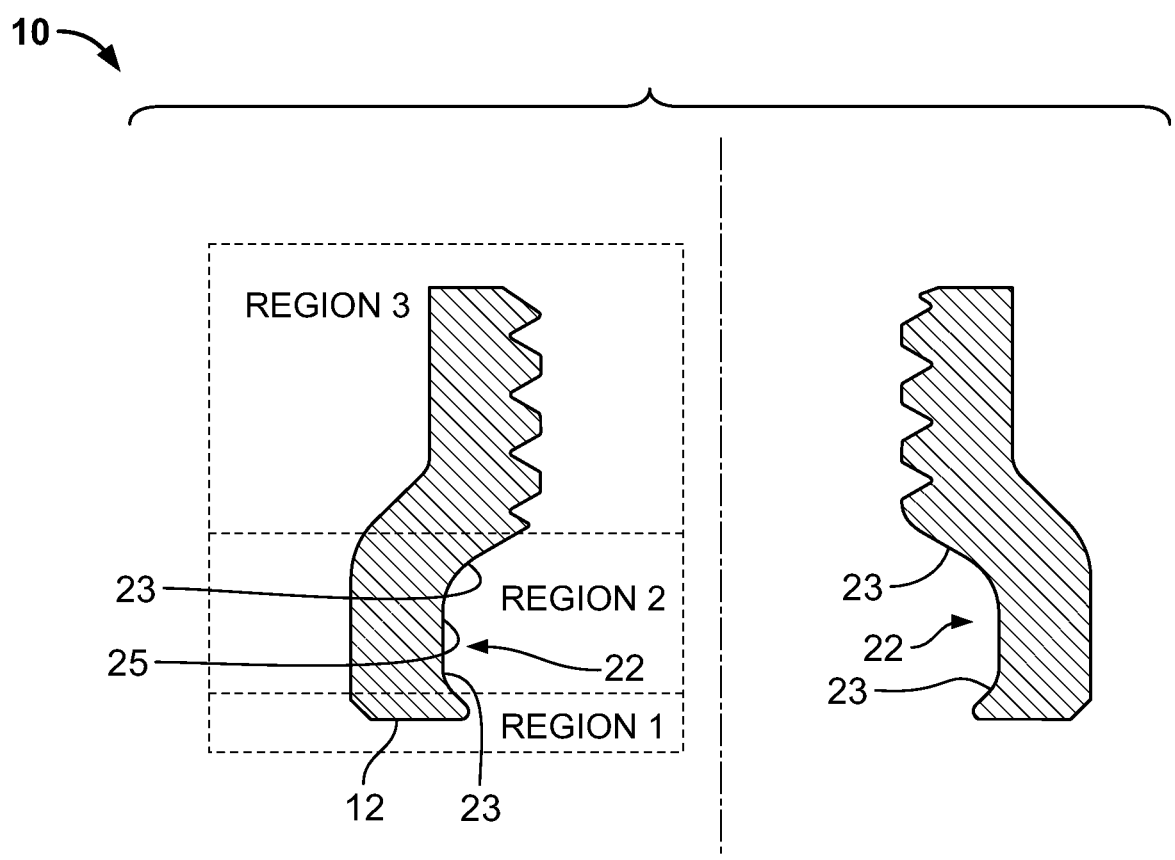
FIG. 2 is a schematic view of an embodiment of a nut shown in FIG. 1.

As shown in FIG. 2, in an embodiment, the nut 10 includes three distinct regions as depicted therein. In an embodiment, Region 1 includes a portion of the bore 20 located proximate to the first end 12. In an embodiment, the portion of the bore 20 in Region 1 has an inner diameter that is substantially similar to the outer diameter of a shank portion of the pin member/bolt (not shown in the Figures). In an embodiment, Region 2 includes the containment cavity 22. In an embodiment, the containment cavity 22 includes an inner diameter that is substantially larger than an outer diameter of the shank of the pin member/bolt. Region 3 includes the threaded portion 24. In an embodiment, Region 3 is the load carrying region of the nut 10.

In certain embodiments, the size and shape of the containment cavity 22 can vary depending upon the particular application design requirements, which governs the exact geometry of the containment cavity 22 in terms of specified angles, curves, surfaces, and/or dimensions that make up the inner wall 25 and hence the determined shape of the containment cavity 22. As such, the containment cavity 22, Region 2, can be connected to Region 1 and Region 3 by curved surfaces, flat surfaces, or conical surfaces 23. Accordingly, with reference to FIG. 2, the profile of these surfaces 23 connecting Region 2 to the adjacent Regions 1 and 3 can be described by a polynomial with (1) at least one inflection point, (2) no inflection points and a concave up shape, (3) no inflection points and a concave down shape, or (4) no inflection points and a linear shape.

In an embodiment, the containment cavity 22 reduces the overall stiffness of the nut 10 by way of the size and shape of the containment cavity 22 and its associated wall thickness. In another embodiment, the overall stiffness of the nut 10 need not be reduced. In other embodiments, the overall stiffness of the nut 10 can be maintained or improved over standard nuts known in the art.

In an embodiment, reducing the stiffness of the nut 10 allows for more compliance in the nut 10 when installed and undergoing operational loading. This compliance in the nut 10 attained from the containment cavity 22 creates a difference in the load distribution proximate to the first end 10 of the nut 10. Because of the reduced stiffness of the nut 10, the fastener will more easily comply with the bearing surface of the mating structure, and, as such, creates a more intimate seal between the bearing surface 26 of the nut 10 and the bearing surface of the structure.

The improved intimacy achieved with the containment cavity 22 can be especially beneficial in the case of fastening composite structures, since minimizing load concentrations along the bearing surface 26 of the nut 10 will reduce the potential for damage and possible delamination of the composite layers during installation of the fastener and operation of the aircraft. Creation of an improved seal becomes very critical in applications related to the lightning strike of metallic fasteners located in composite structures. In the event of a lightning strike to a fastener including the nut 10 installed in a composite structure, if sparking occurs within the fastener, and hot gases and particles are ejected from the fastener hole, the containment cavity 22 provides a larger volume, which will decrease the internal pressure caused by the formation of hot gases. This reduction in internal pressure will aid in preventing the expulsion of ejected material into the environment outside the fastener.

FIGS. 3A through 3F show a number of embodiments of nuts, each of which includes a particular size and shape of the inner wall and the associated containment cavity. Unless indicated otherwise, the structure, features, and function of each of the embodiments of the nuts shown in FIGS. 3A through 3F are similar to those of the nut 10 described above and shown in FIGS. 1 and 2, with some differences among one another being in the size and shape of the inner wall and the associated containment cavity. Reference numbers for common features shown in FIGS. 3A through 3F are increased by one hundred (100) as each embodiment is shown and described hereinafter.

Figure 3A:
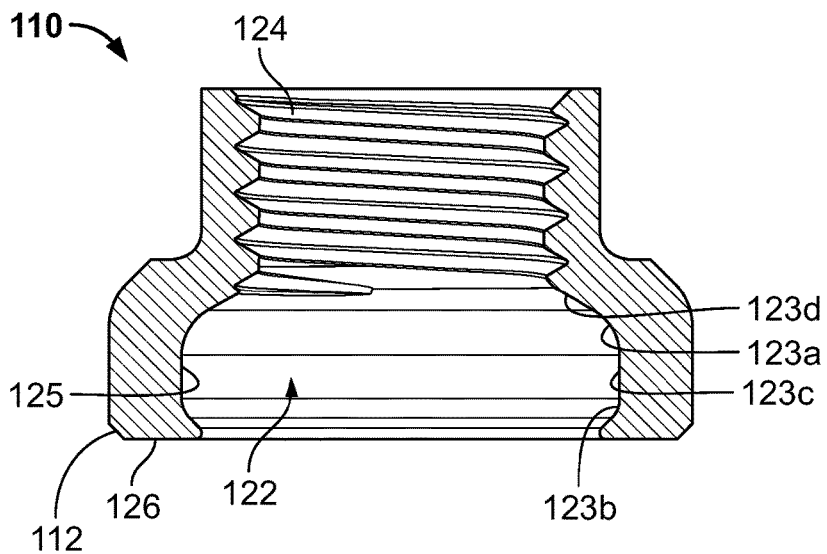
FIGS. 3A through 3G are side cross-sectional views of other embodiments of nuts.

FIG. 3A illustrates a nut 110 having an inner wall 125 defining a containment cavity 122. In an embodiment, the inner wall 125 includes a first concave surface 123a located proximate to an inner threaded portion 124, a second concave surface 123b located proximate to a bearing surface 126 at a first end 112, a first flat (i.e., linear) surface 123c intermediate and joining the first and second concave surfaces 123a, 123b, and a second flat (i.e., linear) surface 123d joining the first concave surface 123a with the threaded portion 124.

Figure 3B:
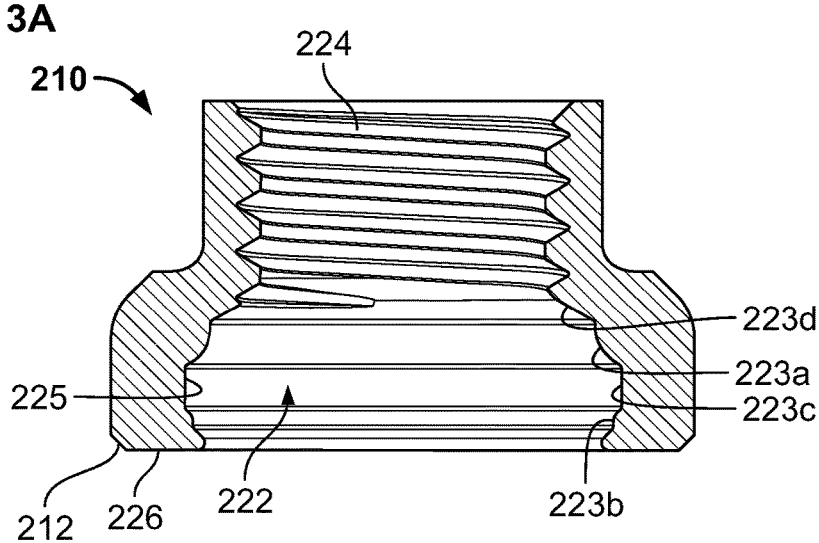

FIG. 3B illustrates a nut 210 having an inner wall 225 defining a containment cavity 222. In an embodiment, the inner wall 225 includes a first convex surface 223a located proximate to an inner threaded portion 224, a second convex surface 223b located proximate to a bearing surface 226 at a first end 212, a first flat (i.e., linear) surface 223c intermediate and joining the first and second convex surfaces 223a, 223b, and a second flat (i.e., linear) surface 223d joining the first convex surface 223a with the threaded portion 224. In an embodiment, the surface area of the first convex surface 223a is greater than the surface area of the second convex surface 223b. In another embodiment, the surface area of the first convex surface 223a is less than the surface area of the second convex surface 223b. In another embodiment, the surface area of the first convex surface 223a is equal to the surface area of the second convex surface 223b.

Figure 3C:
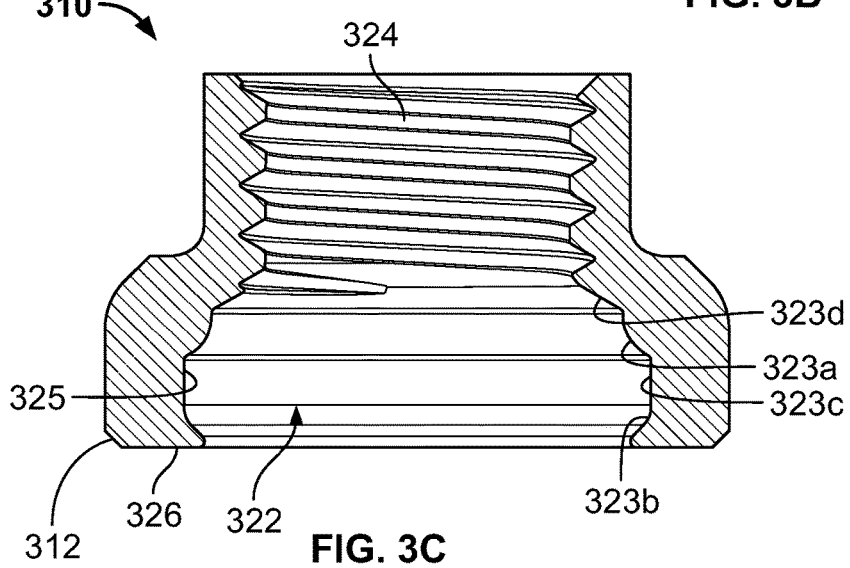

FIG. 3C illustrates a nut 310 having an inner wall 325 defining a containment cavity 322. In an embodiment, the inner wall 325 includes a convex surface 323a located proximate to an inner threaded portion 324, a concave surface 323b located proximate to a bearing surface 326 at a first end 312, a first flat (i.e., linear) surface 323c intermediate and joining the convex surface 323a and the concave surface 323b, and a second flat (i.e., linear) surface 323d joining the convex surface 323a with the threaded portion 324. In an embodiment, the surface area of the convex surface 323a is greater than the surface area of the concave surface 323b. In another embodiment, the surface area of the convex surface 323a is less than the surface area of the concave surface 323b. In another embodiment, the surface area of the convex surface 323a is equal to the surface area of the concave surface 323b. In another embodiment, the locations of the convex surface 323a and the concave surface 323b are switched, such that the convex surface 323a is located proximate to the bearing surface 326 and the convex surface 323b is located proximate to the threaded portion 324 (not shown in FIG. 3C).

Figure 3D:
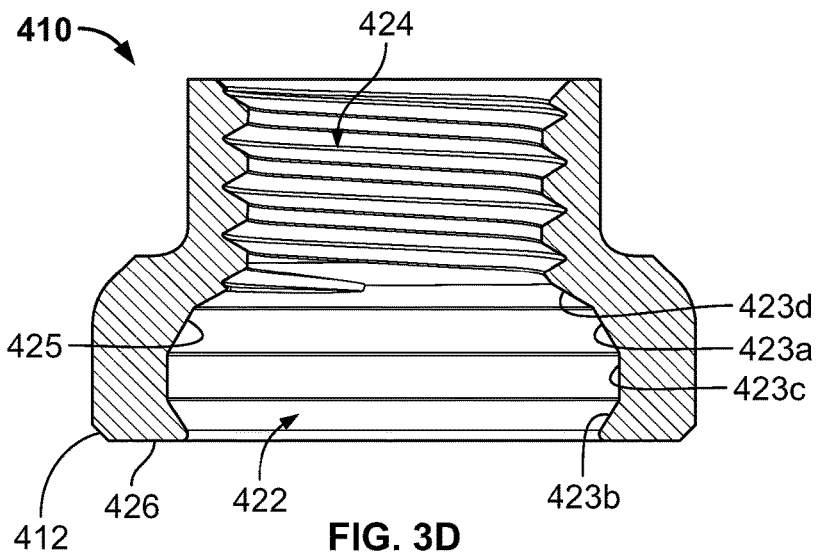

FIG. 3D illustrates a nut 410 having an inner wall 425 defining a containment cavity 422. In an embodiment, the inner wall 425 includes a first flat (i.e., linear) surface 423a located proximate to an inner threaded portion 424, a second flat (i.e., linear) surface 423b located proximate to a bearing surface 426 at a first end 412, a third flat (i.e., linear) surface 423c intermediate and joining the first linear surface 423a and the second linear surface 423b, and a fourth flat (i.e., linear) surface 423d joining the first linear surface 423a with the threaded portion 424. In an embodiment, the surface area of the first linear surface 423a is greater than the surface area of the second linear surface 423b. In an embodiment, the surface area of the first linear surface 423a is equal to the surface area of the second linear surface 423b. In another embodiment, the surface area of the first linear surface 423a is less than the surface area of the second linear surface 423b.

Figure 3E:
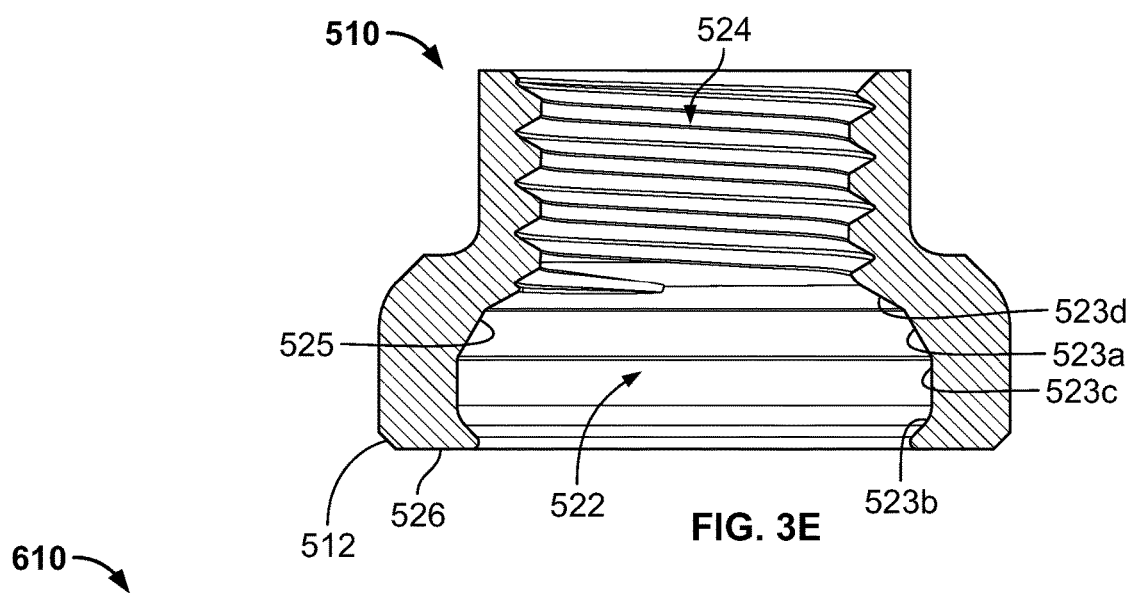

FIG. 3E illustrates a nut 510 having an inner wall 525 defining a containment cavity 522. In an embodiment, the inner wall 525 includes a first flat (i.e., linear) surface 523a located proximate to an inner threaded portion 524, a first concave surface 523b located proximate to a bearing surface 526 at a first end 512, a second flat (i.e., linear) surface 523c intermediate and joining the first linear surface 523a and the first concave surface 523b, and a third flat (i.e., linear) surface 523d joining the first linear surface 523a with the threaded portion 524.

Figure 3F:
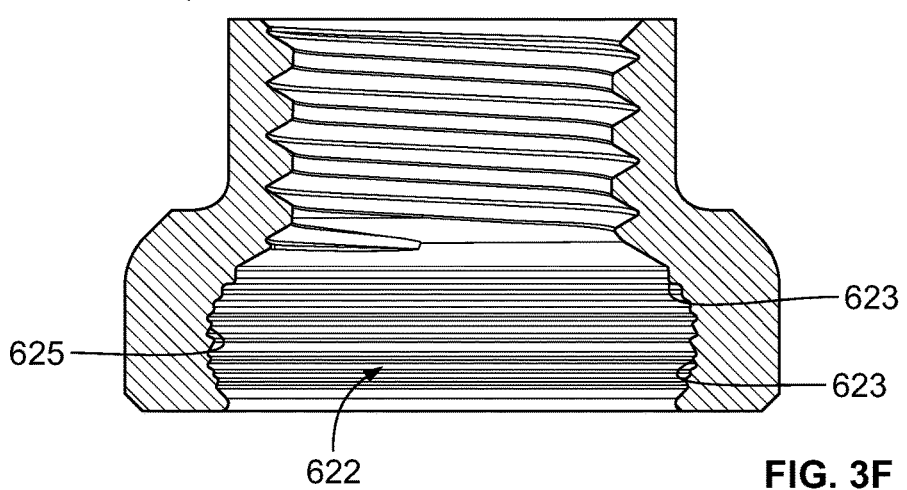

FIG. 3F illustrates a nut 610 having an inner wall 625 defining a containment cavity 622. In an embodiment, the inner wall 625 includes a plurality of surfaces 623 with varying numbers of inflection points, dependent upon the application for the nut 610, and can be flat, concave, and/or convex surfaces of the containment cavities of the embodiments shown in FIGS. 3A through 3E.

In an embodiment, the plurality of surfaces 623 includes a combination of flat (i.e., linear) surfaces, concave surfaces, and convex surfaces, as shown in FIG. 3F. In another embodiment, the plurality of surfaces 623 includes a combination of concave surfaces and convex surfaces. In another embodiment, the plurality of surfaces 623 includes a combination of concave surfaces and flat (i.e., linear) surfaces. In another embodiment, the plurality of surfaces 623 includes a combination of convex surfaces and flat (i.e., linear) surfaces. In another embodiment, the plurality of surfaces 623 includes a plurality of flat (i.e., linear) surfaces. In another embodiment, the plurality of surfaces 623 includes a plurality of convex surfaces. In another embodiment, the plurality of surfaces 623 includes a plurality of concave surfaces.

Figure 3G:
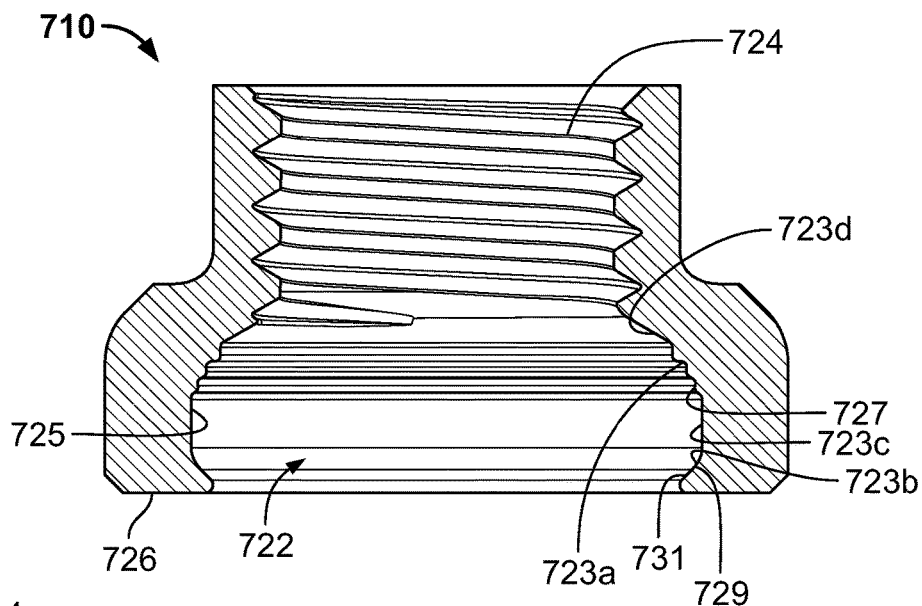

FIG. 3G illustrates a nut 710 having an inner wall 725 defining a containment cavity 722. In an embodiment, the inner wall 725 includes a first region 723a located proximate to an inner threaded portion 724 and having a plurality of concave surfaces 727, a second region 723b located proximate to a bearing surface 726 at a first end 712 and having a concave surface 729 and a first flat (i.e., linear) surface 731 adjacent to the concave surface 729, a second flat (i.e., linear) surface 723c intermediate and joining the first region 723a and the second region 723b, and a third flat (i.e., linear) surface 723d joining the first region 723a with the threaded portion 724.

Figure 4:
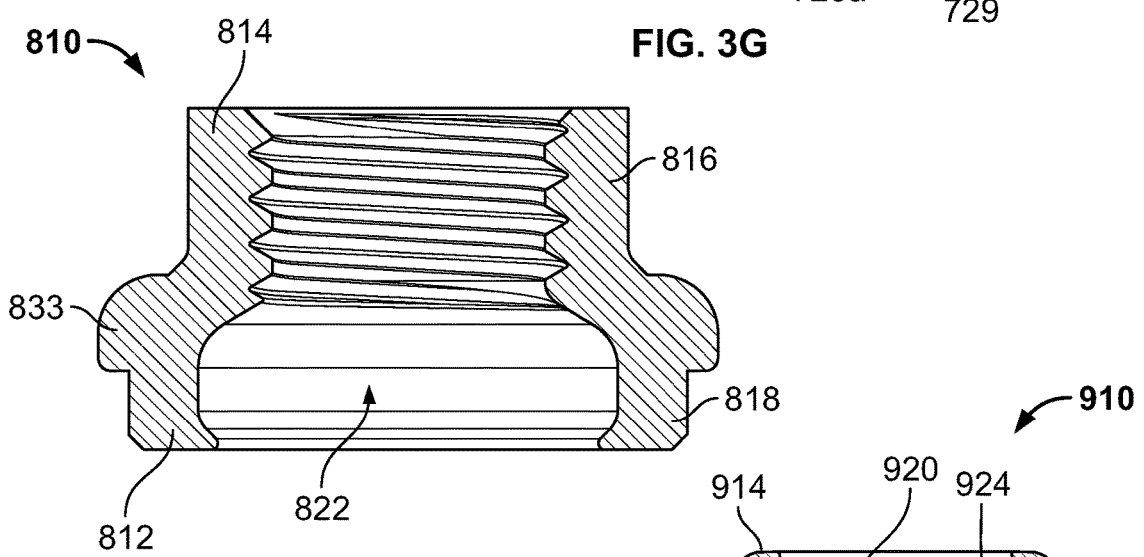
FIG. 4 is a side cross-sectional view of another embodiment of a nut.

FIG. 4 shows another embodiment of a nut 810. Except as noted below, the nut 810 is similar in structure and function to the nut 10. In this regard, in an embodiment, the nut 810 includes a first end 812, a second end 814 opposite the first end 812, a containment cavity 822 located proximate to the first end 812, a shank portion 816, a flanged portion 818 extending outwardly from the shank portion 816, and an annular outer portion 833 that extends outwardly from the flanged portion 818 and located intermediate the first and second ends, 812, 814. In an embodiment, the outer portion 833 is sized and shaped to receive and mate with an external cap (not shown in the Figures). In an embodiment, the cap completely encapsulates the nut 810 when installed (not shown in the Figures). In other embodiments, the containment cavity 822 can have a size and shape as those of the containment cavities 122, 222, 322, 422, 522, 622, 722 shown in FIGS. 3A through 3G and described above.

Figure 5:
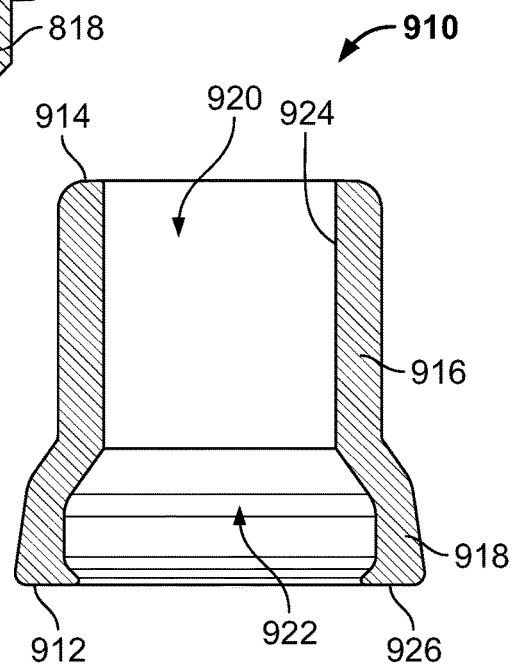
FIG. 5 is a side cross-sectional view of an embodiment of a collar.

Referring to FIG. 5, in an embodiment, a collar 910 includes a first end 912, a second end 914 opposite the first end 912, a tubular-shaped shank portion 916, and a flanged portion 918 extending outwardly from the shank portion 916. In an embodiment, an outer diameter of the flanged portion 918 is greater than an outer diameter of the shank portion 916. In an embodiment, a centrally-located bore 920 extends from the first end 912 to the second end 914. In an embodiment, the bore 920 includes a cylindrical-shaped inner portion 924 extending through the shank portion 916 and a containment cavity 922 located proximate to the first end 912. In an embodiment, the flanged portion 918 includes a bearing surface 926 located at the first end 912. In an embodiment, the collar 910 is a swage collar. In an embodiment, the containment cavity 922 of the collar 910 is similar in structure and function to the containment cavity 22 of the nut 10 described above. In an embodiment, the collar 910 is made from steel. In another embodiment, the collar 910 is made from aluminum. In an embodiment, the collar 910 is made from a titanium alloy, a nickel-based alloy, a copper-based alloy, or a stainless steel-based alloy. In other embodiments, the collar 910 can be made from other materials known in the art.

FIGS. 6A through 6F show a number of embodiments of collars, each of which includes a particular size and shape of the inner wall and the associated containment cavity. Unless indicated otherwise, the structure, features and function of each of the embodiments of the nuts shown in FIGS. 6A through 6F are similar to those of the collar 910 described above and shown in FIG. 5, with some differences among each other being in the size and shape of the inner wall and the associated containment cavity. Reference numbers for common features shown in FIGS. 6A through 6F are increased by one hundred (100) as each embodiment is shown and described hereinafter.

Figure 6A:
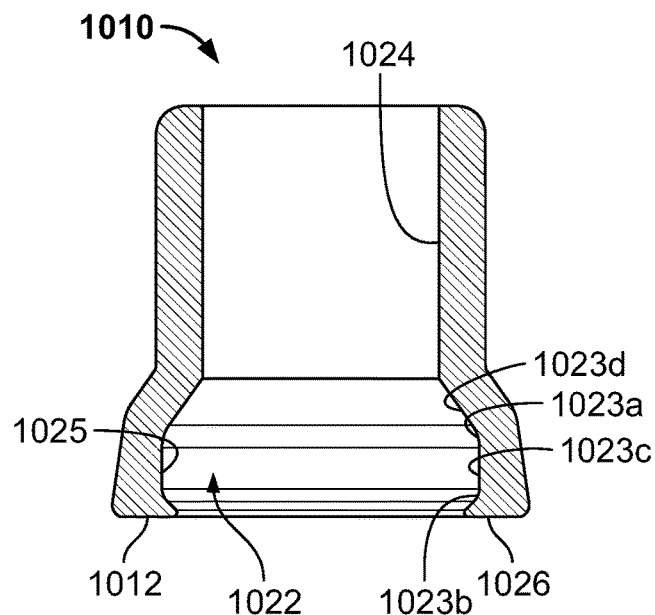
FIGS. 6A through 6G are side cross-sectional views of other embodiments of collars.

FIG. 6A illustrates a collar 1010 having an inner wall 1025 defining a containment cavity 1022. In an embodiment, the inner wall 1025 includes a first concave surface 1023a located proximate to a tubular-shaped inner portion 1024, a second concave surface 1023b located proximate to a bearing surface 1026 at a first end 1012, a flat (i.e., linear) surface 1023c intermediate and adjoining the first and second concave surfaces 1023a, 1023b, and a flat (i.e., linear) surface 1023d adjoining the first concave surface 1023a with the inner portion 1024.

Figure 6B:
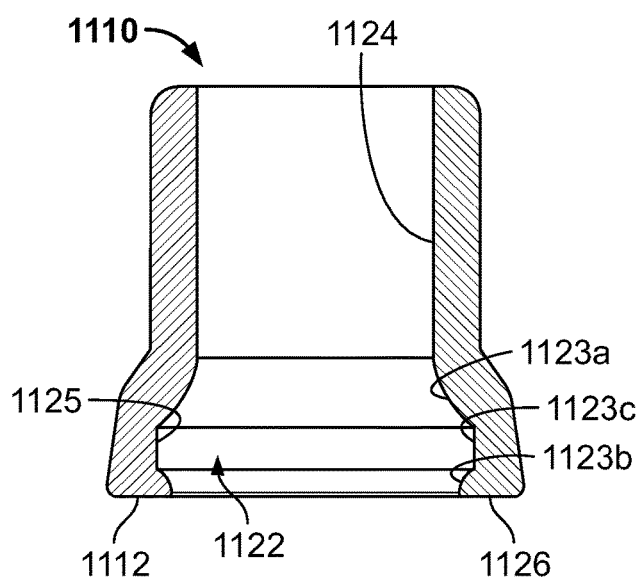

FIG. 6B illustrates a collar 1110 having an inner wall 1125 defining a containment cavity 1122. In an embodiment, the inner wall 1125 includes a first convex surface 1123*a* located proximate to a tubular-shaped inner portion 1124, a second convex surface 1123*b* located proximate to a bearing surface 1126 at the first end 1112 and a flat (i.e., linear) surface 1123*c* intermediate and adjoining the first and second convex surfaces 1123*a*, 1123*b*. In an embodiment, the surface area of the convex surface 1123*a* is greater than the surface area of the second convex surface 1123*b*. In another embodiment, the surface area of the convex surface 1123*a* is less than the surface area of the second convex surface 1123*b*. In an embodiment, the surface area of the convex surface 1123*a* is equal to the surface area of the second convex surface 1123*b*.

Figure 6C:
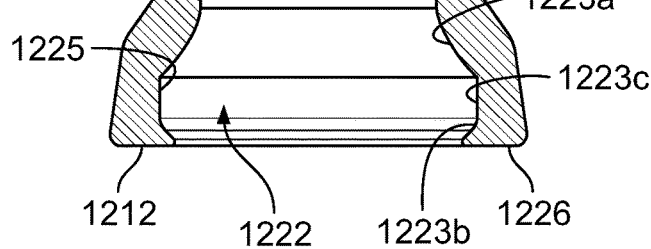

FIG. 6C illustrates a collar 1210 having an inner wall 1225 defining a containment cavity 1222. In an embodiment, the inner wall 1225 includes a first convex surface 1223*a* located proximate to a tubular-shaped inner portion 1224, a first concave surface 1223*b* located proximate to a bearing surface 1226 at the first end 1212 and a flat (i.e., linear) surface 1223*c* intermediate and adjoining the first convex surface 1223*a* and the first concave surface 1223*b*. In an embodiment, the surface area of the convex surface 1223*a* is greater than the surface area of the concave surface 1223*b*. In another embodiment, the surface area of the convex surface 1223*a* is less than the surface area of the concave surface 1223*b*. In another embodiment, the surface area of the convex surface 1223*a* is equal to the surface area of the concave surface 1223*b*. In another embodiment, the locations of the convex surface 1223*a* and the concave surface 1223*b* are switched, such that the convex surface 1223*a* is located proximate to the bearing surface 1226 and the convex surface 1223*b* is located proximate to the inner portion 1224 (not shown in FIG. 6C).

Figure 6D:
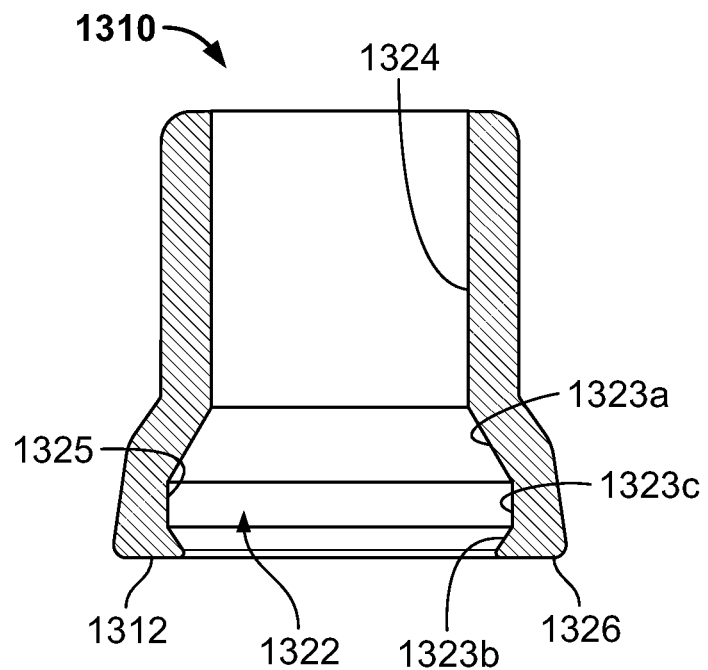

FIG. 6D illustrates a collar 1310 having an inner wall 1325 defining a containment cavity 1322. In an embodiment, the inner wall 1325 includes a first flat (i.e., linear) surface 1323*a* located proximate to a cylindrical-shaped inner portion 1324, a second flat (i.e., linear) surface 1323*b* located proximate to a bearing surface 1326 at the first end 1312, and a third flat (i.e., linear) surface 1323*c* intermediate and adjoining the first linear surface 1323*a* and the second linear surface 1323*b*. In an embodiment, the surface area of the first linear surface 1323*a* is greater than the surface area of the second linear surface 1323*b*. In another embodiment, the surface area of the first linear surface 1323*a* is less than the surface area of the second linear surface 1323*b*. In another embodiment, the surface area of the first linear surface 1323*a* is equal to the surface area of the second linear surface 1323*b*.

Figure 6E:
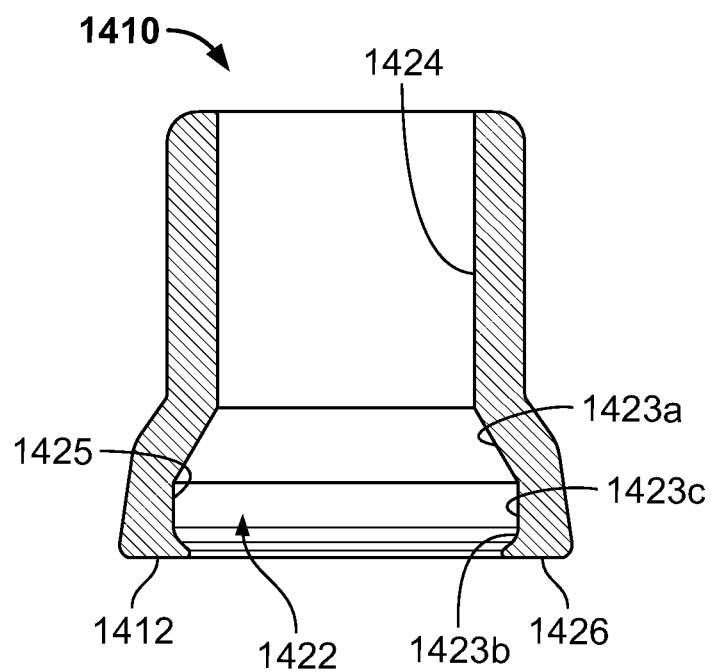

FIG. 6E illustrates a collar 1410 having an inner wall 1425 defining a containment cavity 1422. In an embodiment, the inner wall 1425 includes a first flat (i.e., linear) surface 1423*a* located proximate to a cylindrical-shaped inner portion 1424, a first concave surface 1423*b* located proximate to a bearing surface 1426 at the first end 1412, and a second flat (i.e., linear) surface 1423*c* intermediate and adjoining the first flat surface 1423*a* and the first concave surface 1423*b*.

Figure 6F:
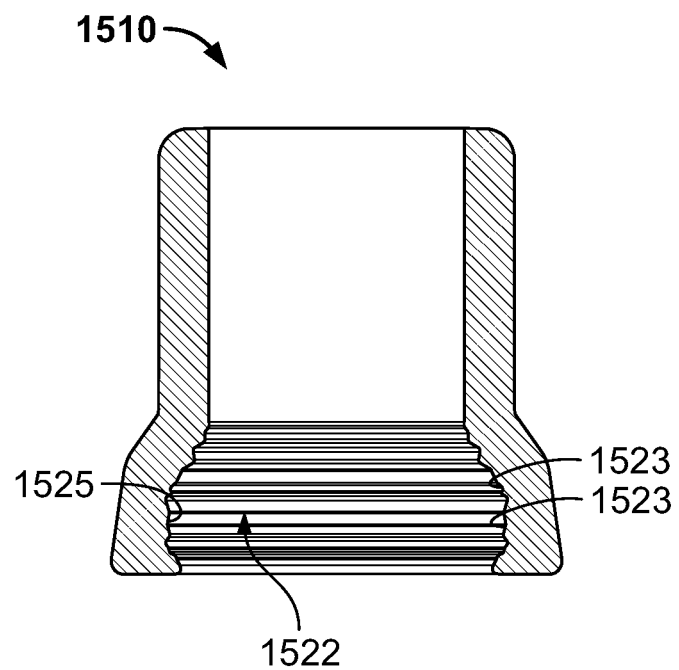

FIG. 6F illustrates a collar 1510 having an inner wall 1525 defining a containment cavity 1522. In an embodiment, the inner wall 1525 includes a plurality of surfaces 1523 with varying numbers of inflection points, dependent upon the application for the collar 1510, and can be flat, concave, and/or convex surfaces of the containment cavities of the embodiments shown in FIGS. 6A through 6E. In an embodiment, the plurality of surfaces 1523 includes a combination of flat/linear surfaces, concave surfaces, and convex surfaces, as shown in FIG. 6F. In another embodiment, the plurality of surfaces 1523 includes a combination of concave surfaces and convex surfaces. In another embodiment, the plurality of surfaces 1523 includes a combination of concave surfaces and flat/linear surfaces. In another embodiment, the plurality of surfaces 1523 includes a combination of convex surfaces and flat/linear surfaces. In another embodiment, the plurality of surfaces 1523 includes a plurality of flat/linear surfaces. In another embodiment, the plurality of surfaces 1523 includes a plurality of convex surfaces. In another embodiment, the plurality of surfaces 1523 includes a plurality of concave surfaces.

Figure 6G:
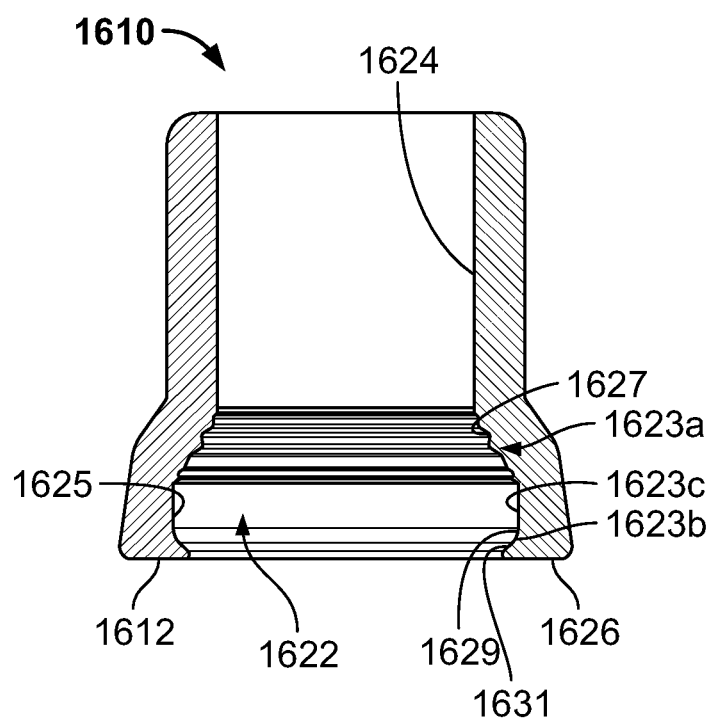

FIG. 6G illustrates a nut 1610 having an inner wall 1625 defining a containment cavity 1622. In an embodiment, the inner wall 1625 includes a first region 1623*a* located proximate to an cylindrical-shaped inner portion 1624 and having a plurality of concave surfaces 1627, a second region 1623*b* located proximate to a bearing surface 1626 and having a concave surface 1629 and a first flat (i.e. linear) surface 1631 adjacent to the concave surface 1629, and a second flat (i.e., linear) surface 1623*c* intermediate and adjoining the first region 1623*a* and the second region 1623*b*.

It should be understood that the embodiments described herein are merely exemplary and that a person skilled in the art may make many variations and modifications without departing from the spirit and scope of the invention. All such variations and modifications are intended to be included within the scope of the claims.

What is claimed is:

1. A swage collar, comprising a first end, a second end opposite the first end, a shank portion extending from the second end to a location intermediate the first and second ends, a flanged portion extending from the shank portion and to the first end, a bore extending from the first end to the second end and including a first interior portion located within the shank portion and a containment cavity located within the flanged portion and proximate to the first end, and an inner wall defining the containment cavity, the shank portion being adapted to be swaged, the containment cavity including an inner diameter that is greater than an inner diameter of the first interior portion of the bore, wherein the inner wall of the containment cavity includes a first concave surface located proximate to the first interior portion, a second concave surface located proximate to the first end, a cylindrical surface intermediate and joining the first and second concave surfaces, and a conical surface joining the first concave surface with the first interior portion.

2. The swage collar of claim 1, wherein the flanged portion includes an annular outer portion extending outwardly therefrom.

3. The swage collar of claim 1, wherein the collar is made from steel.

4. The swage collar of claim 1, wherein the collar is made from aluminum.

5. The swage collar of claim 1, wherein the collar is made from a material chosen from the group consisting of a titanium alloy, a nickel-based alloy, a copper-based alloy, or a stainless steel-based alloy.

\* \* \* \* \*